United States Patent
Lee

(10) Patent No.: US 9,845,207 B2
(45) Date of Patent: Dec. 19, 2017

(54) APPARATUS FOR LOADING BOUND PRODUCTS

(71) Applicant: SHIN HEUNG MACHINERY CO., Gyeonggi-do (KR)

(72) Inventor: Sin-Young Lee, Gyeonggi-do (KR)

(73) Assignee: SHIN HEUNG MACHINERY CO., Gyeonggi-Do (KR)

( * ) Notice: Subject to any disclaimer, the term of this patent is extended or adjusted under 35 U.S.C. 154(b) by 0 days.

(21) Appl. No.: 15/129,824

(22) PCT Filed: Jul. 3, 2015

(86) PCT No.: PCT/KR2015/006894
§ 371 (c)(1),
(2) Date: Sep. 27, 2016

(87) PCT Pub. No.: WO2016/006879
PCT Pub. Date: Jan. 14, 2016

(65) Prior Publication Data
US 2017/0174449 A1    Jun. 22, 2017

(30) Foreign Application Priority Data

Jul. 9, 2014 (KR) .......................... 10-2014-0086109

(51) Int. Cl.
*B65G 57/081* (2006.01)
*H01L 21/677* (2006.01)
(52) U.S. Cl.
CPC .... *B65G 57/081* (2013.01); *B65G 2201/0288* (2013.01)
(58) Field of Classification Search
CPC ...... B65H 2301/42242; B65H 31/3045; B65H 2301/4211; B65G 21/209; B65G 47/901;
(Continued)

(56) References Cited

U.S. PATENT DOCUMENTS 3,776,404 A * 12/1973 Anastasio ............ B65G 57/081
198/374
4,369,015 A * 1/1983 Fabrig .................. B65G 57/081
198/374
(Continued)

FOREIGN PATENT DOCUMENTS

KR    20-0057174    3/1991
KR    20-0334932    12/2003
(Continued)

OTHER PUBLICATIONS

International Search Report for PCT/KR2015/006894 dated Aug. 20, 2015 and its English translation from WIPO.
(Continued)

*Primary Examiner* — Gregory Adams
(74) *Attorney, Agent, or Firm* — Ladas & Parry, LLP

(57) ABSTRACT

Disclosed is a device for loading a bound product, the device holding a product without the product sagging, which has been completed by punching various objects to be bound and then binding same by means of a coil spring, reversing the moving direction to a loading location and thereby enabling neat and stable stacking in a zigzag state without having the coil springs come in contact with one another. A device for loading a bound product, according to the present invention, comprises: a supporting frame unit for providing a distance for the movement of a bound product from a binding location to a loading location; a transfer unit having upper and lower gears, which are axially mounted on one side of the frame unit, a driven gear, which is axially mounted on the other end, a moving belt, for connecting the lower gear and the driven gear, a power belt, which is connected to the upper gear, and a first driving motor, for transmitting power to the power belt; an LM guide having a rail, which is mounted on the frame unit in the length direction, and a block; a reversing unit having a supporting plate, which is fixed on the block of the LM guide and the
(Continued)

moving belt, a pinion, of which the upper end is rotatably and axially mounted on the supporting plate, a first cylinder, for operating a rack gear that interlocks with the pinion, and a rotating plate which is fixed on the lower end of the pinion; and a holding unit having a support and a second cylinder which is mounted on the rotating plate of the reversing unit and has a pressure member coupled to the front end thereof so as to hold a bound product.

3 Claims, 9 Drawing Sheets

(58) Field of Classification Search
CPC ........ B65G 47/22; B65G 59/02; B65G 49/02; B65G 57/081; B65G 2201/0288; Y10T 83/654; Y10T 83/6625
USPC ............... 198/374, 430, 468.2, 468.6, 468.9; 414/758, 763, 773, 779, 783, 788.3, 414/791.2, 791.5, 791.7, 792, 792.3, 414/792.4
See application file for complete search history.

(56) References Cited

U.S. PATENT DOCUMENTS

| | | | | |
|---|---|---|---|---|
| 4,921,387 A | * | 5/1990 | Bennington | B21D 43/145 198/468.6 |
| 6,439,370 B1 | * | 8/2002 | Hoffman, Jr. | A41H 43/0235 198/468.2 |
| 6,591,977 B2 | * | 7/2003 | Spencer | A21C 15/00 198/374 |
| 6,840,898 B2 | * | 1/2005 | Pettersson | G05B 19/19 493/473 |
| 8,066,468 B2 | * | 11/2011 | Klein | B65G 21/2054 100/151 |
| 8,844,707 B2 | * | 9/2014 | Hulslander | B23P 19/001 198/346.2 |
| 2011/0081223 A1 | * | 4/2011 | Medel, P. | H01L 21/67144 414/589 |

FOREIGN PATENT DOCUMENTS

| | | |
|---|---|---|
| KR | 20-0377444 | 3/2005 |
| KR | 20-0418009 | 6/2006 |
| KR | 10-2007-0050684 | 5/2007 |
| KR | 10-2010-0093863 | 8/2010 |
| KR | 10-2011-0113397 | 10/2011 |

OTHER PUBLICATIONS

Written Opinion of the International Searching Authority for PCT/KR2015/006894 dated Aug. 20, 2015 and its English translation by Google Translate.

\* cited by examiner

APPARATUS FOR LOADING BOUND PRODUCTS

CROSS-REFERENCE TO RELATED APPLICATIONS

This application is the U.S. National Stage of International Patent Application No. PCT/KR2015/006894 filed on Jul. 3, 2015, which claims the priority to Korean Patent Application No. 10-2014-0086109 filed on Jul. 9, 2014, the disclosures of which are hereby incorporated in their entireties by reference.

TECHNICAL FIELD

Embodiments of the present invention may relate generally to an apparatus for stacking products hound by using a spring, more particularly, a stacking apparatus for hound products, when moving various type of bound products such as a note, a book, an album and so on, which are punched and bound by the spring, to a stacking location, capable of holding and moving the bound product without a warp and stably stacking the bound products alternately in a zigzag manner without contacting the springs each other by alternatively reversing a direction at the stacking location.

BACKGROUND

Generally, for automatic spring binding of various types of bound products such as a note, a book, an album and so on, a punching device punches holes in coupling parts, and in the next process, a binding device performs binding operation by a wiring spring.

The coupling methods of a spring for binding purposes may be implemented by a one ring type inserting a spiral steel wire into one end and rotating it, and a twin type inserting loops, made by bending a steel wire to have a "C" shape, into each of holes in upward and downward directions to be interlocked with each other and then pressed and fixed.

Additionally, when bound products are stacked in one direction, since the diameter of the spring is larger than the thickness of a paper bundle portion consisted of covers and inserts, the spring portions may become increasingly higher and therefore there may be a problem that it is impossible to stack at some point.

For example, Korean Registered Utility Model No. 20-0418009 (registered on Jun. 7, 2006) teaches a printed matter loading robot as one example of an apparatus for increasing loading efficiency of products. The printed matter loading robot is an apparatus for evenly stacking or separately stacking in a zigzag manner printed matters by using a robot in a process of loading the cut out printed matters on the palette, and this can be used for stacking products having the same thickness.

Additionally, Korean Registered Utility Model No. 20-0057174 (registered on Mar. 4, 1991) teaches a brick rotation moving apparatus, and Korean Registered Utility Model No. 20-0377444 (registered on Mar. 8, 2005) teaches a reversing apparatus for preventing the warp of a cardboard sheet. These apparatuses rotate from a horizontal status to a vertical status or reversely rotate in an opposite direction in the process of moving products to a moving conveyer, and since the structure thereof changes the direction only during the process of moving the products, they are not suitable as an apparatus stacking bound products having different thicknesses.

Further, Korean Registered Utility Model No. 20-0334932 (registered on Dec. 1, 2003) teaches an apparatus for loading notebooks of a notebook packing machine. The apparatus for loading notebooks is an apparatus that an oil pressure cylinder pulls short once and long once an operation plate safely placing notebooks supplied from a moving belt and therefore the rotation degree of the operation plate is controlled, the notebook falling depending on the rotation degree of the operation plate contacts a guiding plate arranged at the lower portion and is placed on the stacking support plate, or the falling notebook contacts an obstacle protrusion and is rotated in 180° degree and then be placed on the stacking support plate so that the notebooks can be stacked in a zigzag manner, because the notebooks are stacked in a zigzag manner the operation time becomes shorter than a traditional manual working way and the productivity is improved because of increasing the volumes of the notebooks, but there is a problem that the product can be damaged by the impact caused by falling and colliding with the obstacle protrusion for 180° rotation and a transferring device for moving notebooks from the binding device to the stacking location is needed, and therefore the structure is complex, the operation process is complicated, and the installation cost and the management and maintenance costs are high.

DETAILED DESCRIPTION OF THE INVENTION

Technical Problem

Accordingly, the embodiments of the present application may solve the problems of prior art described above, the purpose of the embodiments of the present invention may stably stack bound objects in a zigzag manner without contacting binding spring with each other by comprising a holding unit capable of holding a bound product such as a note, a book, an album and so on which is bound by a spring without warping when moving it to a stacking location, and a reversing unit reversing a direction when moving it from a binding location to a stacking location by the assistance of a frame unit and a moving unit.

Technical Solution

To achieve the purpose, an apparatus for loading bound products according to embodiments of the present invention may comprise a supporting frame unit providing a distance to move a bound product bound with a spring from a binding location to a stacking location; a transferring unit comprising upper and lower gears axially installed in a vertical direction at one portion of the frame unit, a subordinate gear axially installed at an other portion of the frame unit, a moving belt connecting the lower gear and the subordinate gear, a power belt of which one portion is connected to the upper gear, and a first driving motor mounted to the frame unit and connected with an other portion of the power belt to deliver rotation power; an LM guide comprising a rail mounted to a lower surface of the frame unit in a length direction, and a block movably connected to the rail; a reversing unit comprising a supporting plate of which upper horizontal plane is fixed to the block of the LM guide and one side vertical plane is fixed to the moving belt, a rack gear interlocked with a pinion of which upper portion is rotatably axially installed in a vertical direction to the supporting plate, a first cylinder mounted to the supporting plate to operate the rack gear, and a rotating plate fixed to a lower portion of the pinion and configured to be rotatable with the pinion; and a holding unit comprising a second cylinder mounted to a lower surface of the rotating plate of the reversing unit in a vertical direction, a front portion of the second cylinder coupled with a pressing unit, and a support connected to the rotating plate and configured to hold the bound product by pressure of the pressing unit when at least a portion of the bound product is placed, wherein the reversing unit alternately reverses a moving direction of the bound product moved by the holding unit to stack the bound products so that binding positions of the spring of the hound products are alternately arranged in a zigzag manner.

Additionally, to achieve the purpose, an apparatus for loading bound products according to embodiments of the present invention may prevent a warp occurred in the bound product by forming a support of a holding unit as a curved groove having a curve shape and the support of the holding unit may be separated and rotated by using a hinge as an axis to freely fall the bound product being rotated and held by the operation of the operational axis of a third cylinder.

Effects of the Invention

According to embodiments of the present invention, because a bound product is directly installed in a moving distance between a binding location to a stacking location the installation and operation may be very easy, as a held portion of the hound product is placed on a supporting part of a curved unit forming a curved groove and then held and fixed by descent of a pressing unit and then both freely movable sides of the bound product are moved upward and raised higher than the horizontal position and its weight does not concentrate on a vertical direction but disposes, it is possible to transfer in a very stably held status and the operation efficiency may be improved, since the operation process alternatively reversing the held bound product during transferring it to a stacking location or after reached to change a stacking direction and the operation process moving the holding unit backward or rotating the supporting unit for freefall can be performed continuously, the stacking operation alternately arranging binding spring portions in a zigzag manner can be performed stably and smoothly and the productivity may be improved, and the manufacturing cost may be minimized by simplifying the configuration and the management and maintenance may become easy.

BEST MODE FOR CARRYING OUT THE INVENTION

An apparatus for loading bound products according to embodiments of the present invention may comprise a supporting frame unit providing a distance to move a bound product bound with a spring from a binding location to a stacking location; a transferring unit comprising upper and lower gears axially installed in a vertical direction at one portion of the frame unit, a subordinate gear axially installed at an other portion of the frame unit, a moving belt connecting the lower gear and the subordinate gear, a power belt of which one portion is connected to the upper gear, and a first driving motor mounted to the frame unit and connected with an other portion of the power belt to deliver rotation power; an LM guide comprising a rail mounted to a lower surface of the frame unit in a length direction, and a block movably connected to the rail; a reversing unit comprising a supporting plate of which upper horizontal plane is fixed to the block of the LM guide and one side vertical plane is fixed to the moving belt, a rack gear interlocked with a pinion of which upper portion is rotatably axially installed in a vertical direction to the supporting plate, a first cylinder mounted to the supporting plate to operate the rack gear, and a rotating plate fixed to a lower portion of the pinion and configured to be rotatable with the pinion; and a holding unit comprising a second cylinder mounted to a lower surface of the rotating plate of the reversing unit in a vertical direction, a front portion of the second cylinder coupled with a pressing unit, and a support connected to the rotating plate and configured to hold the bound product by pressure of the pressing unit when at least a portion of the bound product is placed, wherein the reversing unit alternately reverses a moving direction of the bound product moved by the holding unit to stack the bound products so that binding positions of the spring of the bound products are alternately arranged in a zigzag manner.

An upper portion of the support of the holding unit according to embodiments of the present invention may include a curved groove having a curve shape.

The support of the holding unit according to embodiments of the present invention may be configured to be separable from a supporting unit and a back portion of the support may be extensible and rotatable by coupling with a hinge, and the back portion of the support may comprise a long hole coupled with a front portion of a operation axis of a third cylinder.

Embodiments for Carrying Out the Invention

Hereinafter, preferred embodiments of the present invention will be described in detail with reference to the accompanied drawings.

Figure 1:
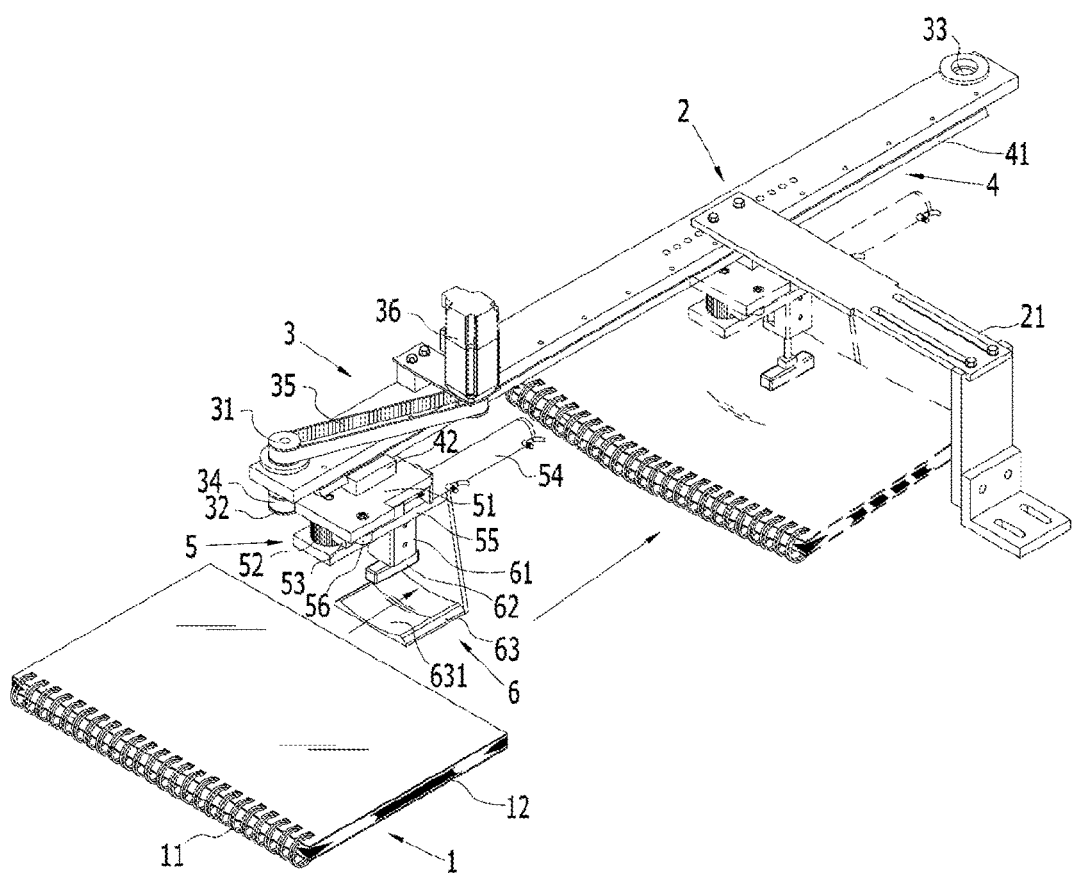
FIG. 1 is a plane perspective view illustrating an apparatus for loading bound products according to embodiments of the present invention.
Figure 2:
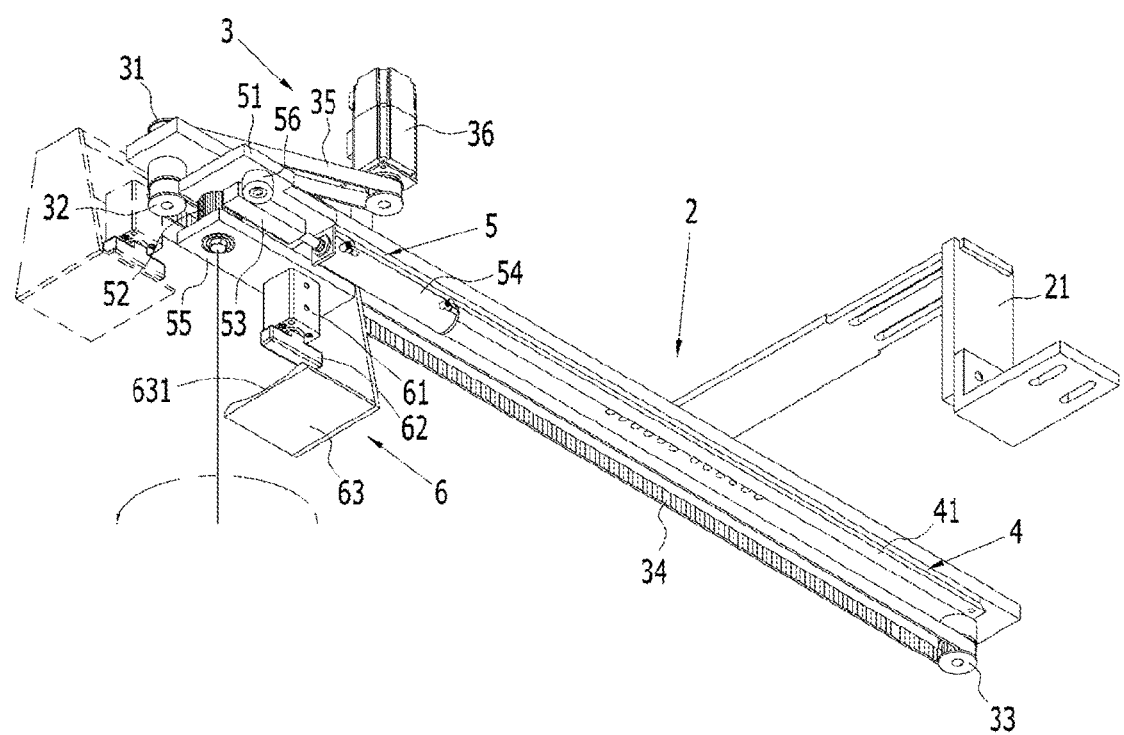
FIG. 2 is a bottom perspective view illustrating an apparatus for loading bound products according to embodiments of the present invention.

FIGS. 1 and 2 are top and bottom perspective views of an apparatus for loading bound products according to embodiments of the present invention, and as illustrated, the apparatus for loading the bound products according to embodiments of the present invention may comprise a frame unit (2), a transferring unit (3), a LM guide (4), a reversing unit (5) and a holding unit (6) to transfer and stack bound products (1) which are bound with a spring (11) and have a cover and a paper bound unit (12) with inserts.

The frame unit (2) may provide a distance for moving a product (1) bound with the spring (11) from a binding location to a stacking location by using a metal board, and may have bearing power for mounting and operating the transferring unit (3), the LM guide (4), the reversing unit (5) and the holding unit (6). The frame unit (2) may be arranged with a binding device (not shown) to be mounted by using a holder (21) coupled by a various kinds of a board and/or a coupling bolt, and as the configuration of the holder (21) is well known in the art, a detail description is omitted.

The transferring unit (3) may be configured to perform to allow reciprocating movement of the holding unit (6) fixing the bound product (1) and the reversing unit (5) alternatively reversing the stacking direction of the bound product (1) after moved to the stacking location or during the transferring, may axially install upper and lower gears (31, 32), integrally formed, to one end of the frame unit (2) to be rotatable in a vertical direction, may axially install a subordinate gear (33) to the other end of the frame unit (2) to correspond to the lower gear (32), may connect the lower gear (32) and the subordinate gear (33) by a moving belt (34) to be interlocked and rotatable, may connect one side of a power belt (35) to the upper gear (31) to be interlocked and rotatable, and may install a first driving motor (36) to the frame unit (2) to be connected to the other end of the power belt (35) and transfer rotational power.

Accordingly, in the transferring unit (3), when the power belt (35) rotate by normal rotation and/or reverse rotation operation of the first driving motor (36), the upper gear (31) interlocked with the power belt (35) may be rotated, the rotation of the upper gear (31) may cause the rotation of the lower gear (32) integrally formed with the upper gear (31), and the moving belt (34) interlocked and connected with the lower gear (32) may be moved simultaneously. Additionally, the moving belt (34) may perform stably reciprocating movement by the subordinate gear (33) interlocked with the other side thereof, and the movement of the moving belt (34) may cause the reciprocal movement of the reversing unit (5) fixed to the moving belt (34) and the holding unit (6) mounted to the reversing unit (5) at the same time.

Further, the moving belt (34) may be comprised to assist more smooth sliding movement of the reversing unit (5) when the moving belt (34) reciprocally moves the reversing unit (5).

The LM guide (4) may comprise a rail (41) mounted to one side of the lower surface of the frame unit (2) in a length direction, and a block (42) movably connected with the rail (41) and connecting and fixing the reversing unit (5).

Figure 3A:
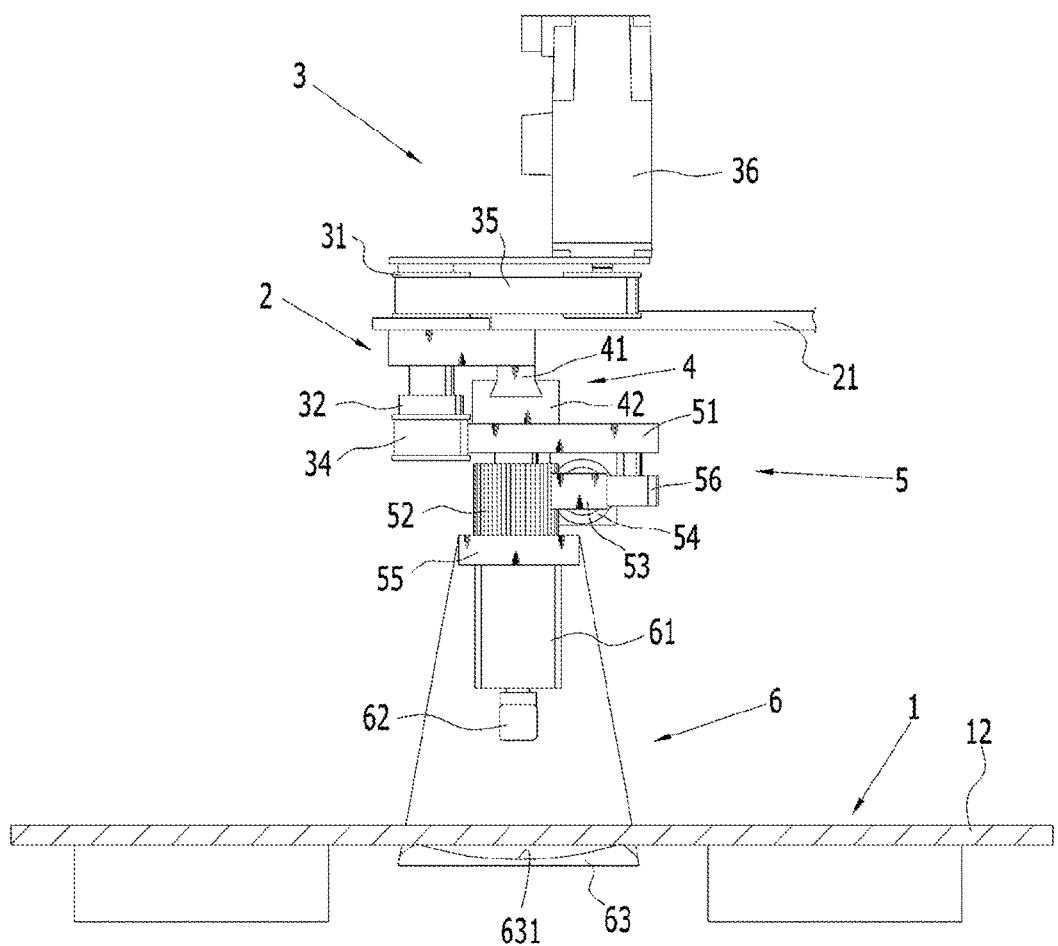
FIGS. 3a and 3b are front views illustrating steps for holding a bound product by a holding unit of an apparatus for loading bound products according to embodiments of the present invention.

Further, the reversing unit (5) may comprise, as shown in FIG. 1 and FIG. 3a, a supporting plate (51) of which upper horizontal plane is connected to the lower surface of the block (42) of the LM guide (4) and fixed by a coupling bolt not shown, wherein one side of the vertical plane of the supporting plate (51) is connected to the moving belt (34) and fixed by a coupling bolt not shown. Additionally, a pinion (52) of which upper portion is rotatably axially mounted in a vertical direction on the lower surface of the supporting plate (51), a rack gear (53) interlocked with the pinion (52), and a first cylinder (54) fixed to the supporting plate (51) to operate the rack gear (53) may be comprised.

Additionally, the reversing unit (5), when the bound product (1) is moved from a binding position to a stacking position by the moving belt (34) and is stacked or loaded, may control so that at the first time the rack gear (53) is not operated and at the next time the direction of the bound product (1) is reversed by 180° rotating the pinion (52) by the operation of the rack gear (53), and the stop and operation of the rack gear (53) may be performed by a main controller for power control not shown.

Figure 4A:
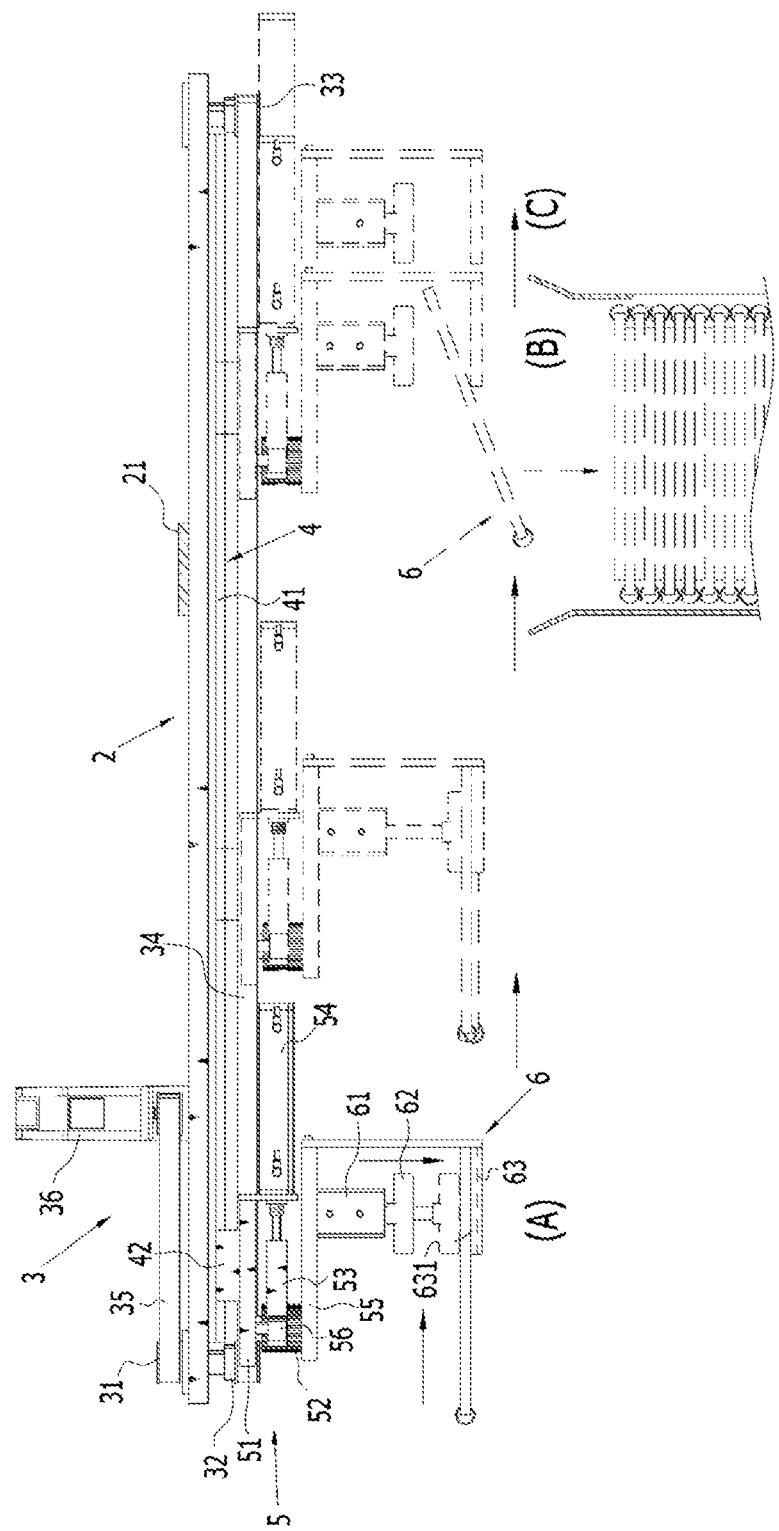
FIGS. 4a and 4b are side views illustrating operation status of a holding unit, a transferring unit and a reversing unit of an apparatus for loading bound products according to embodiments of the present invention.
Figure 4B:
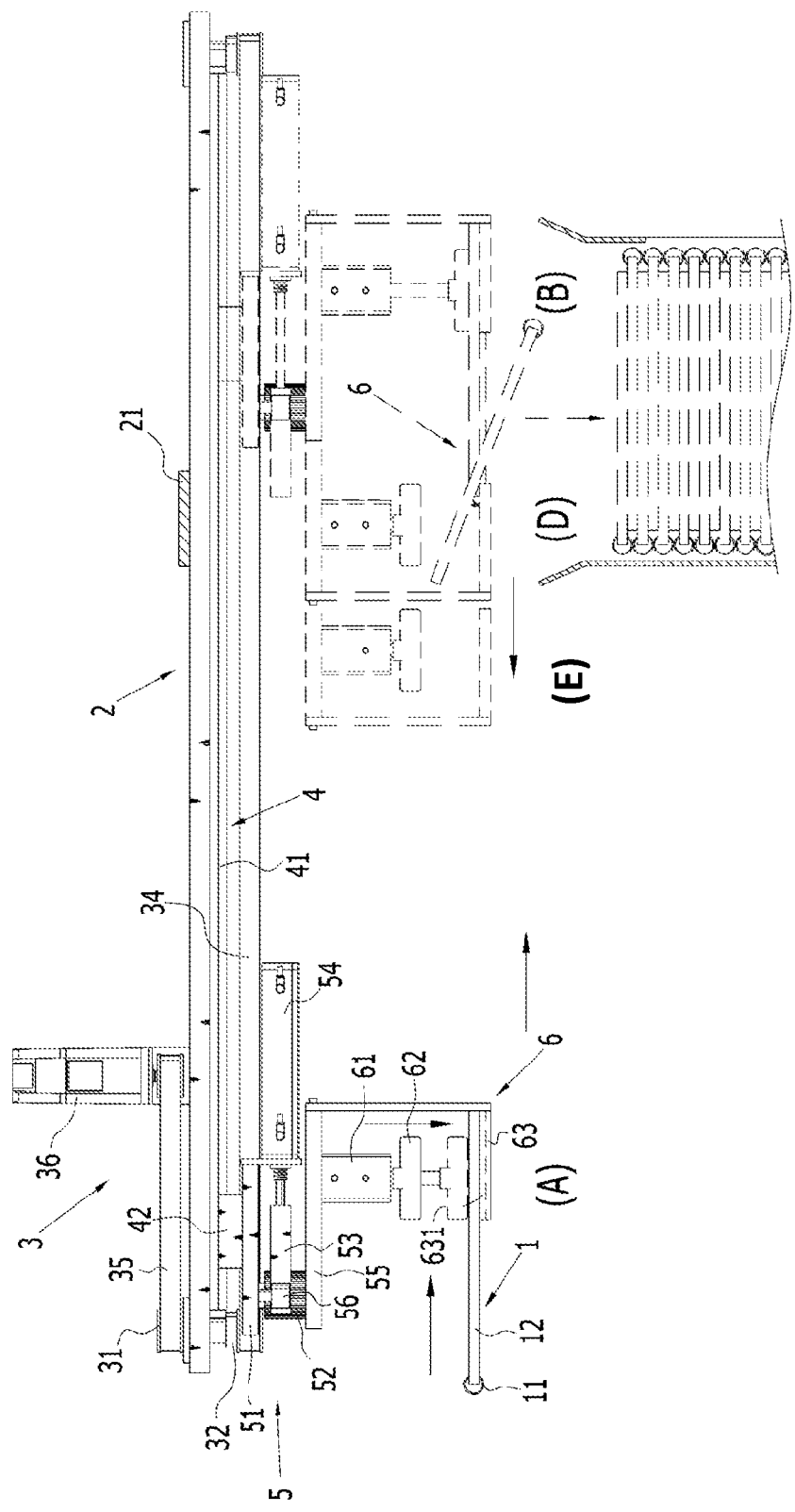

Therefore, as shown in FIGS. 4a and 4b, the reversing unit (5) may perform alternate 180° rotation for the stacking position of the bound products (1) so that the positions of the springs (11) coupled to the bound products (1) are alternately arranged in a zigzag manner.

Further, an assistance roller (56) may be mounted to the to the supporting plate (51) and be rotatable by being contacted with the outside surface thereof so that the rack gear (53) is interlocked with the pinion (52) in a good state to be movable in forward and/or backward directions.

The holding unit (6) may be mounted to the reversing unit (5) and be movable together to performing operations catching and moving the bound product (1), and may stack or load the bound products (1) in order after catching the bound products (1) one by one, moving it to the stacking location in the fixed status and then releasing it.

The holding unit (6) may install a second cylinder (61) in a vertical direction connecting a pressing unit (62) to the front portion of the lower surface of the rotating plate (55) fixed to the lower portion of the pinion (52) of the reversing unit (5), and may comprise a support (63) configured to, when the holding unit (6) is coupled to the rotating plate (55) and at least a portion of the bound product (1) is placed, hold and fix the bound product (1) with decent pressure of the pressing unit (62).

The bound product (1) may not a single solid matter but the paper bound unit (12) which has a bunch of papers such as a plurality of covers and inserts and is bound by the spring (11), and therefore, when a portion of the bound product (1) is caught or held by the holding unit (6) and then the bound product (1) is moving, as the rest portion can be warped by its weight it may be wobbled and since it can be collided with a worktable the work efficiency may be lowered. This problem can be solved by making the size of the support (63) of the holding unit (6) the same as the size of the bound product (1), but it may be also inefficient because the work space for catching and holding the bound product (1) at the binding location and releasing it at the stacking location will be increased by enlarging the size of the support (63), the size of operating parts will be affected and the load will be increased.

Therefore, the size of the support (63) of the holding unit (6) may need to be minimized, and, as shown in FIG. 3a, by forming a curved groove (631) having a curve shape recessed in the middle thereof a warp caused by the weight of the portion bound with the spring (11) during the transferring may be prevented.

Figure 3B:
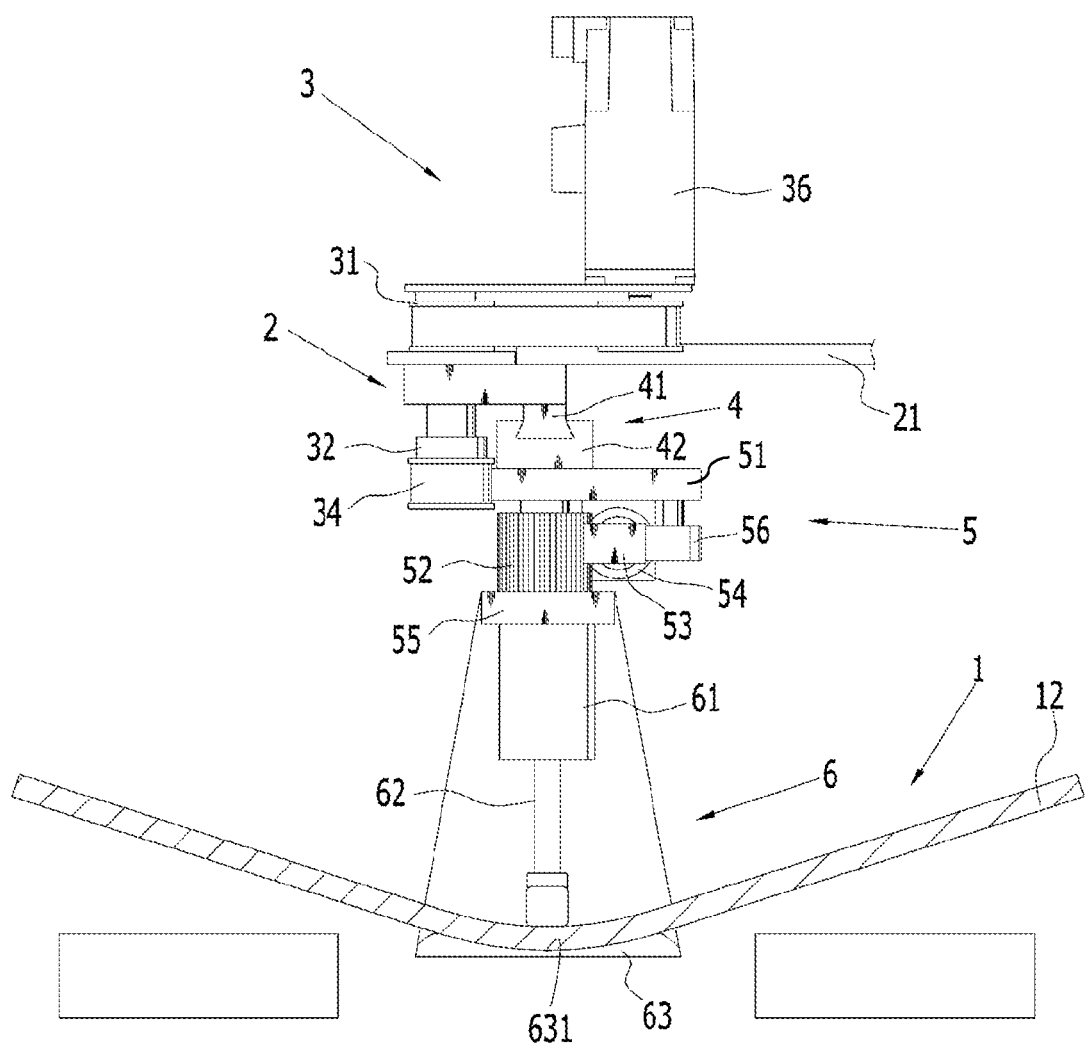

Therefore, when the held portion of the hound product (1) is pressed by moving the pressing unit (62) downwardly, as shown in FIG. 3b, the paper bound unit (12) of the bound product (1) may be moved downward and be contacted to the curved portion (631) of the support (63) forming a curved groove shape, and both freely movable sides which are portions not contacted with the curved portion (631) may be moved upward and raised higher than the level of the curved portion (631). In this time, because the weight of the upwardly moved portions of the bound product (1) may not be converged in the vertical direction and dispersed, the warp may be prevented and it may be possible to transfer in a very stable holding state.

Further, the pressing unit (62) of the holding unit (6) may be moving upwardly to release from the holding status so that after moving the bound product (1) to the stacking position the bound product (1) can freely fall, and at the same time the holding unit (6) may be moved out from the stacking fall position by the operation of the transferring unit (3).

Figure 5:
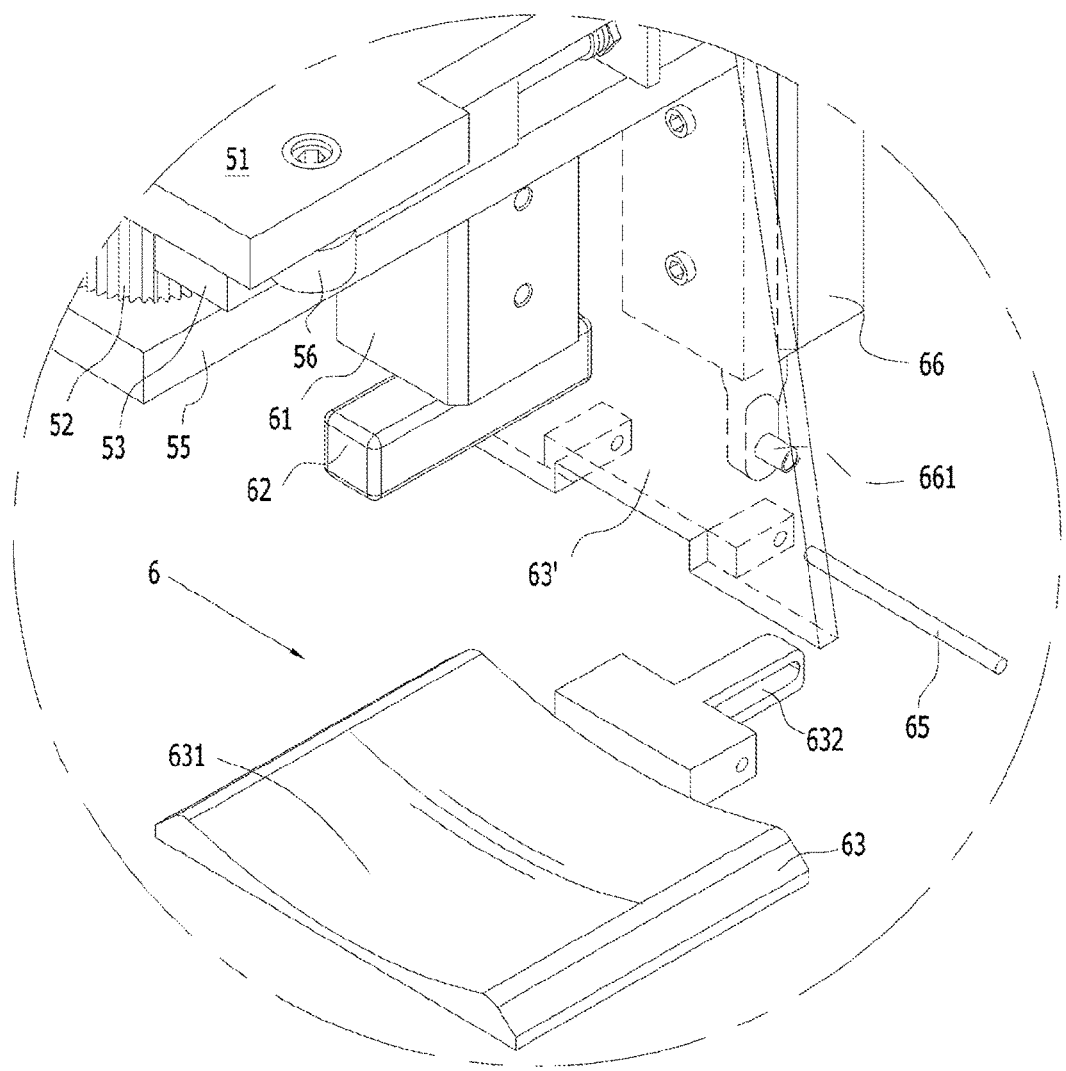
FIG. 5 is a partial enlarged cross-sectional view illustrating a holding unit according to another embodiment of the present invention.
Figure 6A:
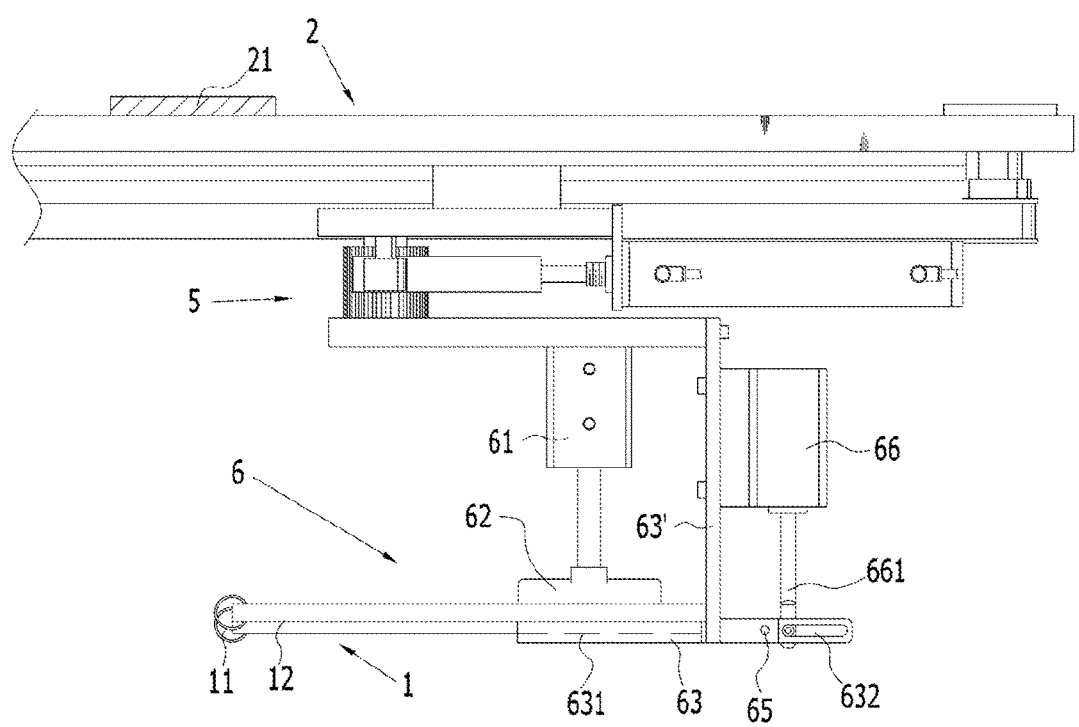
FIGS. 6a and 6b are side views illustrating operation status of a holding unit according to another embodiment of the present invention.

According to another embodiment for free fall of the bound product (1), as shown in FIGS. 5 and 6a, when the bound product (1) is arrived at the stacking location by the holding unit (6), the support (63) of the holding unit (6) may be separated from the supporting unit (63') and a back portion thereof may be connected to the hinge (64) to be rotatable for free fall by releasing the holding state, and a long hole (632) may be formed at the back portion of the support (63) to be operated in a state that a front portion of a operation axis (661) of a third cylinder (66) fixed to the supporting unit (63') is coupled.

Next, the operation of an apparatus for loading bound products according to embodiments of the present invention consisted as described above will be described.

When the support (63) of the holding unit (6) is moved to the lower portion of the product (1) bound by the spring (11) from a binding device not shown as shown in FIG. 1, the lower portion of the bound product (1) may be placed on the support (63) as shown in (A) of FIG. 3a and FIG. 4a.

Then, when the upper portion of the paper bound unit (12) is pressed and fixed by the descent of the pressing unit (62) by the operation of the second cylinder (61), the paper bound unit (12) may be moved downward and contacted to the curved groove (631) of the support (63) have a curved shape as shown in FIG. 3b, and both freely movable sides of the bound product (1) which are portions not contacted with the curved groove (631) may be moved upward and raised higher than the level of the curved groove (631), and therefore, the bent may be prevented.

The first driving motor (36) may perform a normal direction rotation in a state that the holding unit (6) stably holds the bound product (1) not to occur the warp of the bound product (1), and the rotation power of the first driving motor (36) may be delivered to the power belt (35), the upper gear (31) and the lower gear (32) and then the moving belt (34) interlocked with the lower gear (32) may be moved.

In this step, the reversing unit (5) having the supporting plate (51) connected to the moving belt (34) and the holding unit (6) mounted to the reversing unit (5) may move forward to the stacking position simultaneously as shown in (B) of the FIG. 4a. In this time, the block (42) of the LM guide (4) fixing the supporting plate (51) of the reversing unit (5) may smoothly move the reversing unit (5) and the holding unit (6) installed to the reversing unit (5) by the assistance of the rail (41).

Further, when the holding unit (6) is moved to the stacking location, the operation of the first driving motor (36) of the transferring unit (3) may be stopped and the holding unit (6) which is moving the bound product (1) may be stopped, and then, shown in (B) and (C) of FIG. 4a, by moving the pressing unit (62) of the second cylinder (61) upwardly, releasing the pressing state of the bound product (1), which is held, at the same time moving further the holding unit (6) forwardly by further rotation of the first driving motor (36) in a normal direction, the free fall of the bound product (1) may be performed smoothly.

When the first driving motor (36) is reversely rotated to move a next bound product (1) after the free fall of the one bound product (1) at the stacking location, the moving belt (34) of the transferring unit (3) may be also moved in a reverse direction and the reversing unit (5) and the holding unit (6) may be returned to the binding position.

In the returning state, by each steps described above, after holding the next bound product (1) at the position (A) of FIG. 4b, the transferring unit (3) may be moved to the position (B) of FIG. 4b by the transferring unit (3) and be stopped, then when the first cylinder (54) is operated and the rack gear (53) is moved forward, the pinion (52) interlocked with the rack gear (53) may be rotated to 180° rotate the bound product (1) to the position (D) of FIG. 4d, and then as shown in the portions (D) and (E) of FIG. 4B the pressing unit 62 of the second cylinder (61) may be moved upward to release the pressing state of the bound product (1) which is held and the holding unit (6) may be further moved backward by further rotation of the first driving motor (36) in a reverse direction, and therefore the free fall of the bound product (1) may be performed smoothly.

Additionally, to transfer a next bound product (1) after falling the one bound product (1) at the stacking position, when the first driving motor (36) is rotated in a reverse direction, the moving belt (34) of the transferring unit (3) may also be moved in a reverse direction, the position of the supporting unit (51), which has been reversed when the reversing unit (5) and the holding unit (6) are returned to the binding position, may be returned to an original status by reverse operation and the holding unit (6) may again hold the next bound product (1).

Accordingly, as described above, one time, the bound object (1) moved to the stacking location by the holding unit (6) may be fallen as the transferred status as it is and the next time a bound product (1) transferred subsequently may be fallen after 180° rotation by the operation of the reversing unit (5), and when this process is repeated, the spring (11) portion of the bound product (1) may be alternately stacked in a zigzag manner while the paper hound units (12) contact each other, and therefore it may be possible to stably stack bound objects and the stacking levels can be further heightened.

Figure 6B:
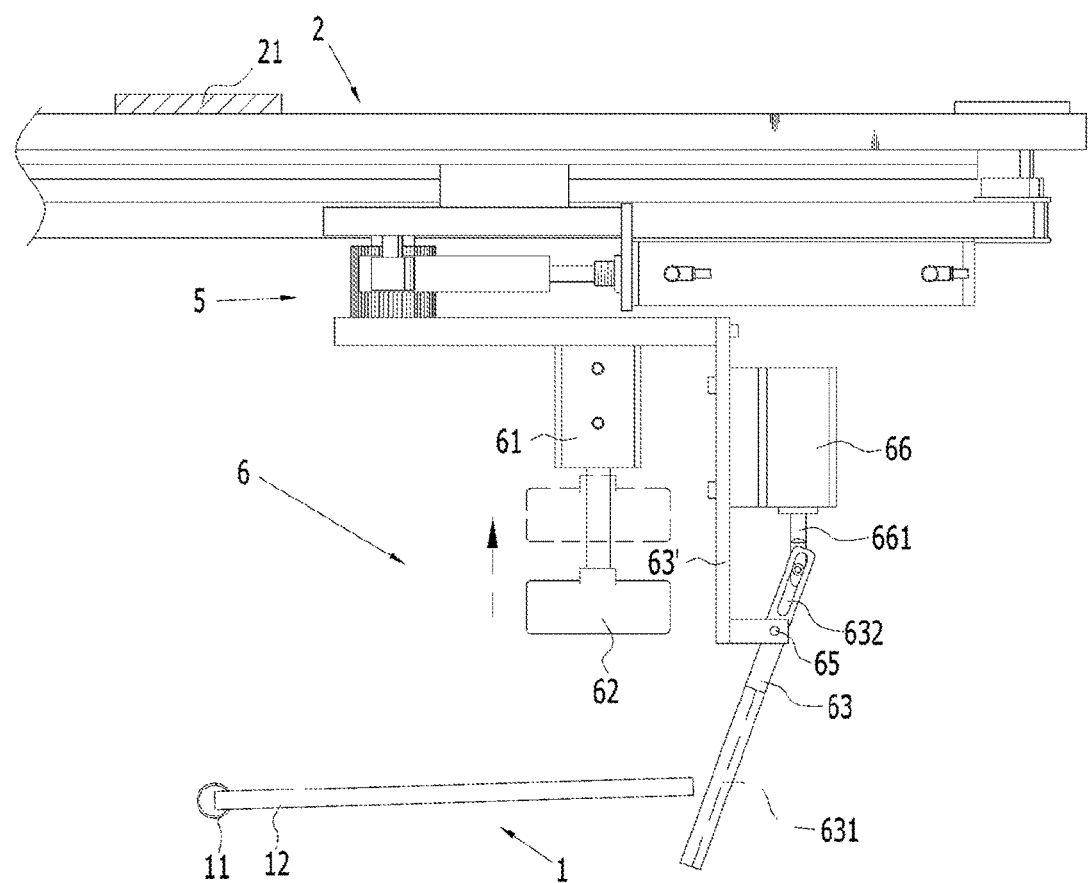

Additionally, as described above, instead of the operation of moving the holding unit (6) for falling the bound product (1) transferred to the stacking location, as shown in FIGS. 6a and 6b, when the operation axis (661) of the third cylinder (66) is moved upward or downward, the long hole (632) of the support (63) may perform a linking function, the support (63) may be rotated around an axis which is the hinge (65), the front portion of the support (63) may be moved downward and the releasing status may become, and therefore the operation efficiency may be more improved than operating the transferring unit (3) as a whole as the bound product (1) may be easily fallen.

The forgoing disclosure explains and illustrates preferred embodiments of the present invention, but it is not intended to be limited to the configuration and operation illustrated and explained. Accordingly, as a person having ordinary skill in the art can easily understand that the embodiments can be properly changed and modified, proper modification and variations and its equivalents are within the scope of the present invention.

What is claimed is:

1. An apparatus for loading bound products, comprising:
   a supporting frame unit providing a distance to move a bound product bound with a spring from a binding location to a stacking location;
   a transferring unit comprising
      upper and lower gears axially installed in a vertical direction at one portion of the frame unit,
      a subordinate gear axially installed at an other portion of the frame unit,
      a moving belt connecting the lower gear and the subordinate gear, a power belt of which one portion is connected to the upper gear, and a first driving motor mounted to the frame unit and connected with an other portion of the power belt to deliver rotation power;

an LM guide comprising a rail mounted to a lower surface of the frame unit in a length direction, and a block movably connected to the rail;

a reversing unit comprising a supporting plate of which upper horizontal plane is fixed to the block of the LM guide and one side vertical plane is fixed to the moving belt, a rack gear interlocked with a pinion of which upper portion is rotatably axially installed in a vertical direction to the supporting plate, a first cylinder mounted to the supporting plate to operate the rack gear, and a rotating plate fixed to a lower portion of the pinion and configured to be rotatable with the pinion; and a holding unit comprising a second cylinder mounted to a lower surface of the rotating plate of the reversing unit in a vertical direction, a front portion of the second cylinder coupled with a pressing unit, and a support connected to the rotating plate and configured to hold the bound product by pressure of the pressing unit when at least a portion of the bound product is placed, wherein the reversing unit alternately reverses a moving direction of the bound product moved by the holding unit to stack the bound products so that binding positions of the spring of the bound products are alternately arranged in a zigzag manner.

2. The apparatus for loading the bound products of claim 1, wherein an upper portion of the support of the holding unit includes a curved groove having a curve shape.

3. The apparatus for loading the bound products of claim 1, wherein the support of the holding unit is configured to be separable from a supporting unit and a back portion of the support is extensible and rotatable by coupling with a hinge, and the back portion of the support comprises a long hole coupled with a front portion of a operation axis of a third cylinder.

* * * * *